US006633105B2

United States Patent
Ohnishi et al.

(10) Patent No.: US 6,633,105 B2
(45) Date of Patent: Oct. 14, 2003

(54) PERMANENT MAGNET MOTOR

(75) Inventors: Kazuo Ohnishi, Gunma (JP); Masafumi Sakamoto, Gunma (JP); Noriyoshi Kikuchi, Gunma (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/104,864

(22) Filed: Mar. 22, 2002

(65) Prior Publication Data

US 2002/0175581 A1 Nov. 28, 2002

(30) Foreign Application Priority Data

Mar. 30, 2001 (JP) ........................... 2001-099395

(51) Int. Cl.$^7$ ................ H02K 37/00; H02K 37/04
(52) U.S. Cl. ..................... 310/254; 310/49 R
(58) Field of Search ................... 310/49 R, 254

(56) References Cited

U.S. PATENT DOCUMENTS 5,309,051 A   5/1994  Kobori
6,124,651 A * 9/2000  Yoshimura et al. ....... 310/49 R

FOREIGN PATENT DOCUMENTS

| EP | 03212149 | 9/1991 |
| EP | 06038488 | 10/1994 |
| EP | 07123685 | 5/1995 |
| EP | 0 993 102 A1 | 4/2000 |
| JP | 06014514 | * 1/1994 |
| JP | 07131968 | * 5/1995 |

OTHER PUBLICATIONS

XP–000846999 Optimierte Magnete Fur Hybridschrittmotoren; F&M 106 (1998) 7–8 © Carl Hanser Verlag, Munchen, pp. 503–506.

* cited by examiner

*Primary Examiner*—Nestor Ramirez
*Assistant Examiner*—Heba Y. Elkassabgi
(74) *Attorney, Agent, or Firm*—Patterson, Thuente, Skaar & Christensen, L.L.C.

(57) ABSTRACT

A permanent magnet motor having a stator and a permanent magnet rotor facing the stator with a gap therebetween, the stator having a plurality of stator magnetic poles extending radially toward a peripheral surface of the rotor, s number of small stator teeth formed on a tip end of each of the magnetic poles, and exciting windings of m phases wound around the stator magnetic poles. The rotor having a cylindrical permanent magnet having pieces of N pole and pieces of S pole arranged alternately in a peripheral direction thereof at equal pitches, wherein a pitch of the small stator teeth is $1\pm1/(2ms)$ times larger than a pitch of the rotor magnetic pole pairs. The width of the small stator tooth is 37~47% of the magnetic pole pitch. A depth of the groove formed between the adjacent small stator teeth is more than 15 times larger than the length of the air gap between the stator and the rotor.

2 Claims, 7 Drawing Sheets

PRIOR ART

PERMANENT MAGNET MOTOR

BACKGROUND OF THE INVENTION

1. Field of the Invention

The present invention relates to a permanent magnet motor, and more particularly to an electric motor having a permanent magnet ring rotor capable of reducing cogging torque and increasing a magnetic flux.

2. Description of the Prior Art

A conventionally implemented three-phase hybrid type stepping motor having a permanent magnet ring rotor is discloses in Japanese Patent Application Laid-Open No. 14514/94 and Japanese Patent Application Laid-Open No. 131968/95.

However, no effective manner for reducing cogging torque and increasing a magnetic flux with respect to such three-phase stepping motor has been obtained.

3. Description of Magnetic Flux Analysis

An unexpected magnetic flux flow could be observed according to the two dimensional analysis of the magnetic field with respect to the conventionally implemented three-phase hybrid type stepping motor having a permanent magnet ring motor, and it was found that a shape of the magnetic pole could be improved.

FIG. 1 shows a structure of a permanent magnet type stepping motor of the original design. The stepping motor comprises a stator iron core 1 and a rotor 4. The stator iron core 1 comprises a cylindrical stator yoke, six magnetic poles 2 extending radially from an inner peripheral surface of the stator yoke, a plurality of small stator teeth 3 formed on a tip end of each of the magnetic poles 2, and exiting windings (not shown) each wound around each of the magnetic poles 2. The rotor 4 is arranged concentrically with the stator iron core 1 and comprises a cylindrical permanent magnet 5 and a back yoke 6 of a magnetic material intimately contacted with an inner peripheral surface of the permanent magnet 5, an outer peripheral surface of the permanent magnet 5 facing with a gap an inner peripheral surface formed of inner peripheral surfaces of the small stator teeth 3. The permanent magnet 5 has P pieces of N pole and P pieces of S pole arranged alternately in a peripheral direction thereof at equal intervals.

A depth of a groove formed between the small stator teeth 3 is 0.4 mm, and a length of the air gap between the inner peripheral surface of the small stator tooth 3 of the stator iron core 1 and the outer peripheral surface of the rotor 4 is 0.06 mm.

The permanent magnet 5 has 32 pole pieces of radial anisotoropy made of neodymium bond. It is considered that the figure of the permanent magnet 5, such as a square form or locally cut does not affect on the result of calculation, so that such figure is not considered in order to calculate economically.

For the FEM calculation, only an upper half portion of the magnet is considered to utilize the periodicity, and the air gap is divided by an interval of 0.25° in order to make sure the accuracy of the cogging torque, and the interlinkage magnetic flux passing through the windings and the cogging torque are calculated by rotating until one period of 22.5° with an interval of 0.75°.

FIG. 2A and FIG. 2B show flows of magnetic flux obtained by the analysis. According to these figures, the following results can be obtained.

(1) A relatively large magnetic flux is passed through the groove between the small stator teeth 3.

(2) There is a magnetic flux closed between the adjacent magnetic poles.

(3) An about 75% of the total interlinkage magnetic flux passing through the windings is entered into the central tooth and about 25% of the total interlinkage magnetic flux is entered into the teeth at the both sides.

(4) The magnetic flux passing through the central tooth is waved while passing through the grooved portion and passed again through the teeth at the both sides.

It has been considered that a magnetic circuit is formed so that the magnetic flux is hardly passed through the grooved potions, but the effective magnetic flux is passed through in each of small stator teeth equally. However, in the actual motor, it is found as stated above that the unexpected flow of the magnetic flux is generated. The value of 3.36 E–5 (Wb) of the interlinkage magnetic flux coincides with the value of 3.18 E–5 (Wb) of the interlinkage magnetic flux calculated from the actually measured value of the induced voltage, so that the validity of the calculation is guaranteed.

Proposed designs as shown in a Table 1 are studied.

TABLE 1

| Item | | conventional design ○ | first plan ① | second plan ② | third plan ③ | recommended value |
|---|---|---|---|---|---|---|
| distance of small teeth | | 20° | 22.5° | 21.25° | 21.25° | 21.25° |
| width of small tooth | | 2.0 | 1.6 | 1.6 | 2.2 | 2.2 |
| depth of groove | | 0.4 | 1.0 | 1.0 | 1.0 | 1.0 |
| thickness of back yoke | | 1.0 | 1.75 | 1.75 | 1.75 | 1.0 |
| thickness of shoulder of magnetic pole | | 1.1 | 1.5 | 1.5 | 1.5 | 0.9 |
| calculation result | interlinkage magnetic flux | 3.36E-5 (Wb) | 4.74E-5 | 4.46E-5 | 4.6E-5 | 4.6E-5 |
| | cogging torque | 40.5 (gf.cm) | 319.3 | 17.2 | 22.3 | 22.0 |

Here, ○ is the conventional design, ① is a first plan, ② is a second plan, and ③ is a third plan.

In the first plan, the distance between adjacent small stator teeth is varied from the short pitch of 88.9% of the conventional design to the full pitch similar to the magnetic pole period, the width of the small stator tooth and the depth of the groove between the adjacent small stator teeth are so determined that the leakage magnetic flux from the grooved portion is minimized, and the thickness of each of the back yoke and the shoulder portion for connecting the small teeth of the magnetic pole are so determined that the effect of the saturation becomes minimum.

As a result, the interlinkage magnetic flux is increased by 40%, however, the first plan is not favorable because the cogging torque is increased about eight times. The calculation value of the wave form of the cogging torque is shown in FIG. 3.

It is apparent from the Table 1 that the cogging torque has an oscillation of sixth harmonics as like as that in the other three-phase hybrid type stepping motor. In case of normal m-phase motor, the cogging torque has 2mth harmonics. In order to remove the sixth harmonics, in this case, a deviation angle of $(120°/2m/p=1.25°)$ at which vectors are balanced at $(360°/s=120°)$ in the sixth harmonic plane is selected.

In the second and third plans, a pitch of $360°/p$ $(1-1/2ms)=21.25°$ is employed. Here, s is a small teeth number per pole with winding, m is a phase number, and p is pole pair number=16. As a result, the cogging torque is similar to that in the conventional design, but the interlinkage magnetic flux can be increased by 30% and more. Accordingly, an output may be increased by more than 30% because the torque is in proportion to the interlinkage magnetic flux. Further, the width of the small stator tooth can be increased to some extent. In this case, a pitch smaller by the deviation angle than the rotor magnetic pole pair pitch $360°/p$ is selected. However, the same result can be obtained if a pitch $360°/p$ $(1+1/2ms)=23.75°$ larger by the deviation angle than that is selected.

As stated above, it can be assumed that an optimum value is near the improved second and third plans of the small tooth pitch 21.25°. However, it is necessary to determine the optimum value in consideration of the following points;

(1) a preferable width of small tooth, (2) a preferable depth of groove, (3) a preferable thickness of the back yoke, and (4) a preferable thickness of the shoulder connecting the small teeth of the magnetic pole with winding.

Next, the effects applied on the interlinkage magnetic flux by the small tooth width etc. are studied by the magnetic field analysis. Following results are obtained by calculation the interlinkage magnetic flux by varying the small tooth width etc. on the basis of the design of the best third plan ③ in the Table 1.

(Effect of the Small Tooth Width)

FIG. 4 shows calculated values of the interlinkage magnetic flux and the cogging torque in case that the small tooth width is varied from 1.6 mm to 2.4 mm.

Here, the small tooth pitch is 0.944 mm, the small tooth depth is 1.0 mm, the thickness of the shoulder is 1.5 mm, and the thickness of the back yoke is 1.75 mm.

The interlinkage magnetic flux becomes muximum when the small tooth width is 2.2 mm, which is a ratio of 0.431 to the magnetic pole pitch of 22.5°. The cogging torque is not so affected by the small tooth width.

(Effect of the Depth of the Groove Between Adjacent Small Teeth)

FIG. 5 shows a relation between the calculated rate of the interlinkage magnetic flux with respect to the conventional design (Table 1) in case that the depth of the groove at the small teeth portion is varied from 0.4 mm to 1.6 mm.

Here, the small tooth pitch is 0.944 mm, the small tooth width is 2.2 mm, the thickness of the shoulder is 1.5 mm, and the thickness of the back yoke is 1.75 mm.

It is understood that the interlinkage magnetic flux is increased uniformly according to the increase of the depth of the groove.

If the depth of the groove becomes large, the effect thereof becomes saturated, so that the depth of the groove of about 1.0 mm is preferable. If it is 1.0 mm, the interlinkage magnetic flux is increased by about 35% with respect to that of the conventional design.

(Effects of the Thicknesses of the Shoulder Portion and the Back Yoke)

FIG. 6 and FIG. 7 show the effects of the thickness of the shoulder portion of the magnetic pole and the thickness of the back yoke to the interlinkage magnetic flux, respectively.

It is noted that the interlinkage magnetic flux is not affected in the ranges of the shoulder thickness and the back yoke shown in FIG. 6 and FIG. 7. The back yoke thickness of more than 0.9. mm is necessary, because interlinkage magnetic flux is slightly reduced at the thickness of 0.75 mm.

As stated above results, the values shown in the column of recommended value in Table 1 are preferable. FIG. 8 shows wave forms of the induced voltage in case of the recommended value with respect to the conventional design or original. It is apparent from FIG. 8 that the amplitude is increased by about 37% and the wave form is approached to a sin wave.

FIG. 9 shows flows of magnetic flux. The distribution of the magnetic flux at each of the small teeth is improved and the waved magnetic flux passing through the groove is reduced compared with that in the conventional design shown in FIG. 2B. Further, the thickness of the shoulder portion of the magnetic pole of 0.9 mm is sufficient in view of the magnetic circuit. However, the thickness of the shoulder portion can be increased as that in the conventional design in consideration of the mechanical strength.

The present invention can be obtained by those new knowledge.

SUMMARY OF THE INVENTION

An object of the present invention is to provide a permanent magnet motor comprising a stator and a permanent magnet rotor facing the stator with a gap therebetween, the stator having a plurality of stator magnetic poles extending radially toward a peripheral surface of the rotor, s number of small stator teeth formed on a tip end of each of the magnetic poles, and exciting windings of m phases wound around the stator magnetic poles, and the rotor having a cylindrical permanent magnet having pieces of N pole and pieces of S pole arranged alternately in a peripheral direction thereof at equal pitches, wherein a pitch of the small stator teeth is $1±1/(2ms)$ times larger than a pitch of the rotor magnetic pole pairs.

Another object of the present invention is to provide a permanent magnet motor comprising a stator and a permanent magnet rotor facing the stator with a gap therebetween, the stator having a plurality of stator magnetic poles extending radially toward a peripheral surface of the rotor, s number of small stator teeth formed on a tip end of each of the magnetic poles, and exciting windings of three phases wound around the stator magnetic poles, and the rotor having a cylindrical permanent magnet having pieces of N pole and pieces of S pole arranged alternately in a peripheral direction thereof at equal pitches, wherein a pitch of the small stator teeth is $1±1/(6s)$ times larger than a pitch of the rotor magnetic pole pairs.

The width of the small stator tooth is 37~47% of the magnetic pole pitch.

The depth of the groove formed between the adjacent small stator teeth is more than 15 times larger than the length of the air gap between the stator and the rotor.

The forgoing and other objects, features, and advantages of the present invention will become apparent from the following more particular description of preferred embodiments of the invention, as illustrated in the accompanying drawings.

DESCRIPTION OF THE PREFERRED EMBODIMENTS

Figure 1:
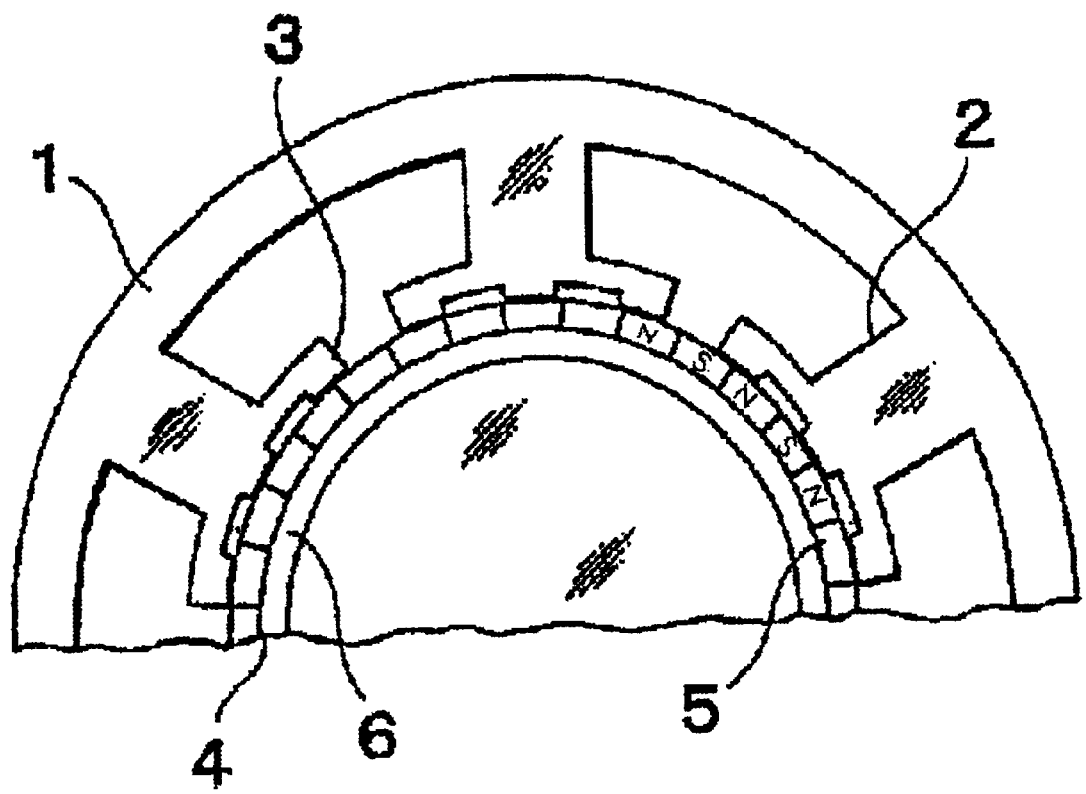
FIG. 1 shows a structure of a permanent magnet type stepping motor for explaining the magnetic field analysis.
Figure 2A:
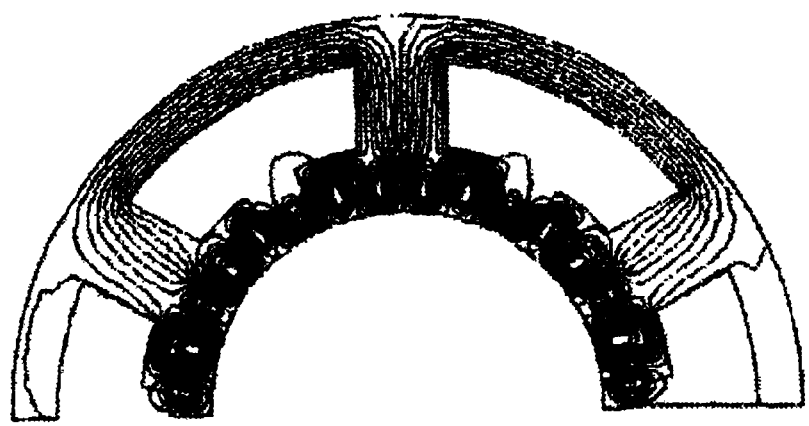
FIG. 2A shows flows of magnetic flux obtained by the analysis.
Figure 2B:
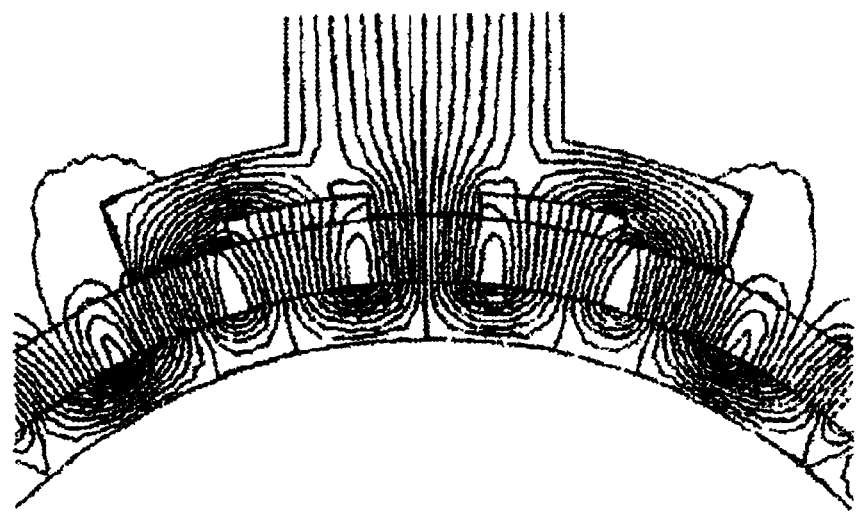
FIG. 2B is an enlarged view of a part of the magnetic flux shown in FIG. 2A.
Figure 3:
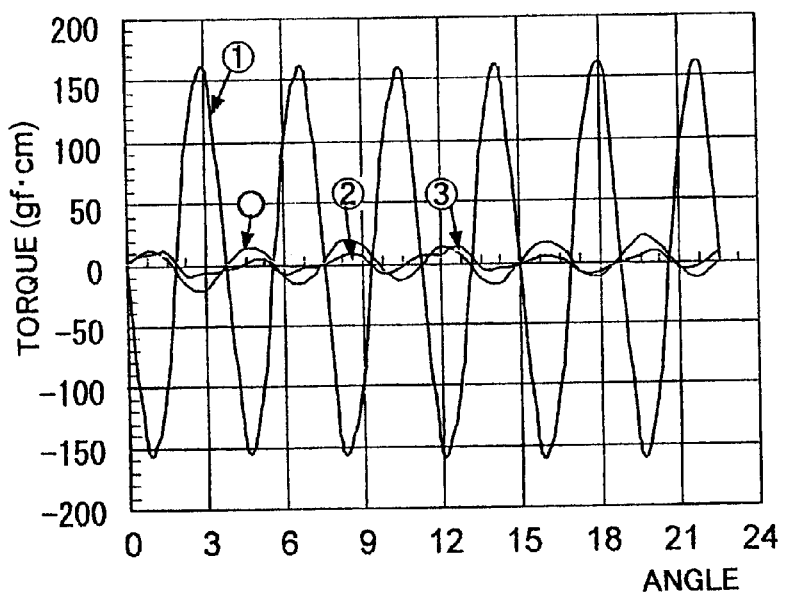
FIG. 3 shows wave forms of a cogging torque.
Figure 4:
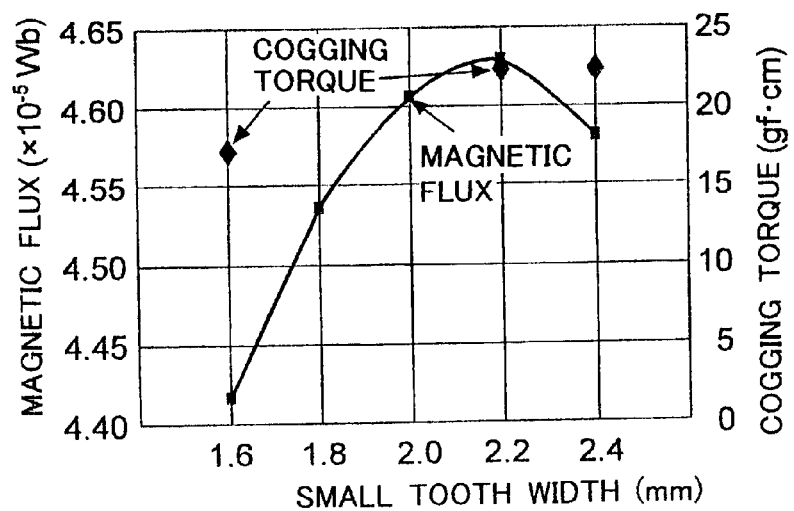
FIG. 4 is a graph showing the relation between a small tooth width, interlinkage magnetic flux and cogging torque.
Figure 5:
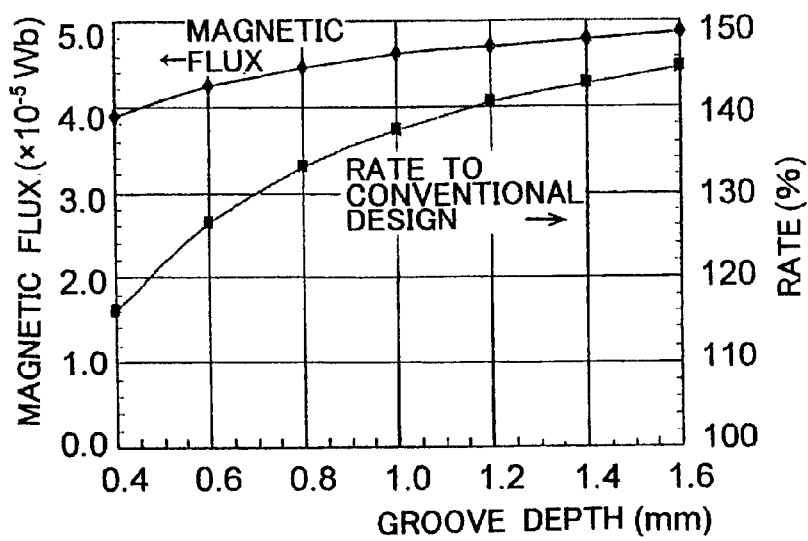
FIG. 5 is a graph showing the relation between a groove depth and the interlinkage magnetic flux.
Figure 6:
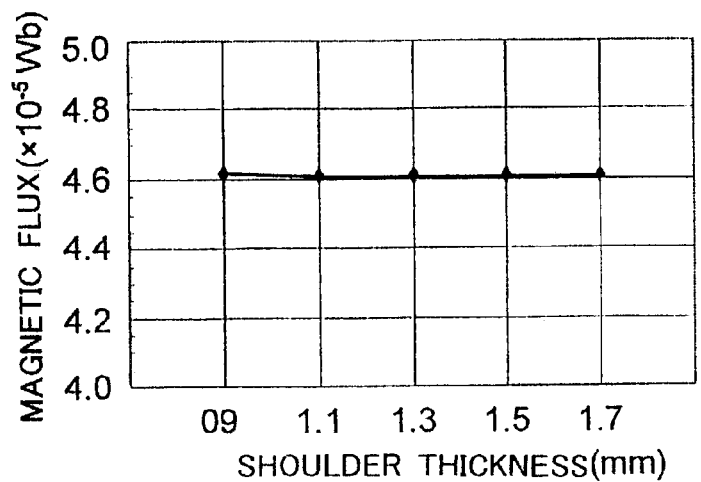
FIG. 6 is a graph showing the relation between a thickness of shoulder portion of the magnetic pole and the interlinkage magnetic flux.
Figure 7:
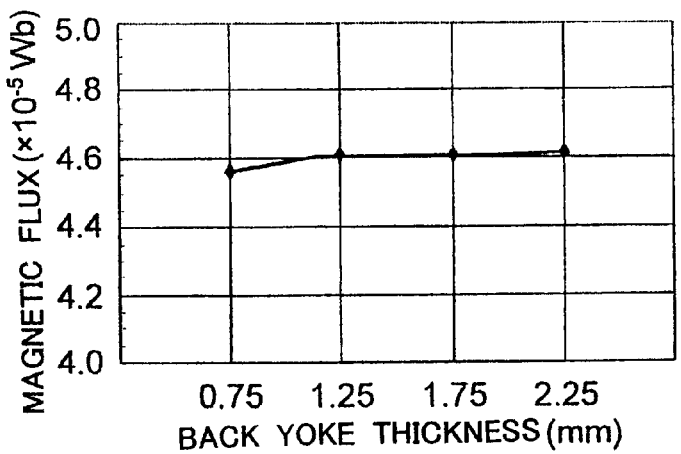
FIG. 7 is a graph showing the relation between a thickness of a back yoke and the interlinkage magnetic flux.
Figure 8:
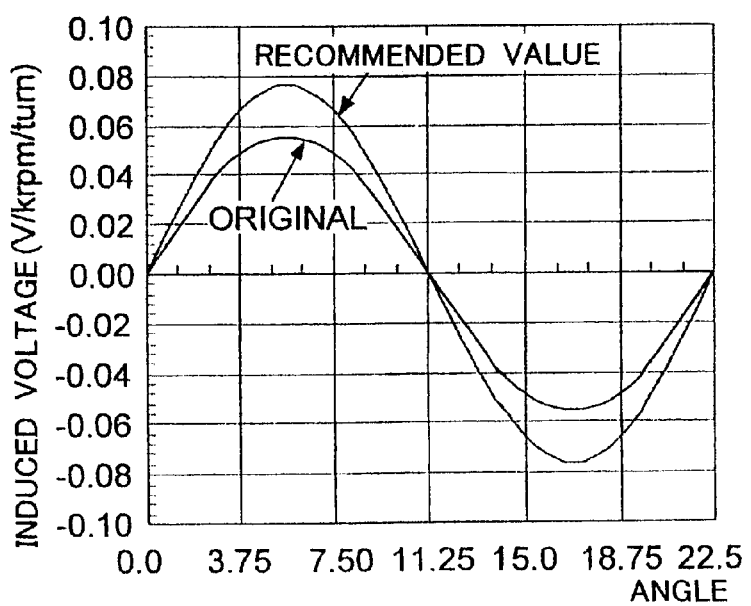
FIG. 8 is a graph showing wave forms of an induced voltage with respect to recommended values and values in the conventional design.
Figure 9:
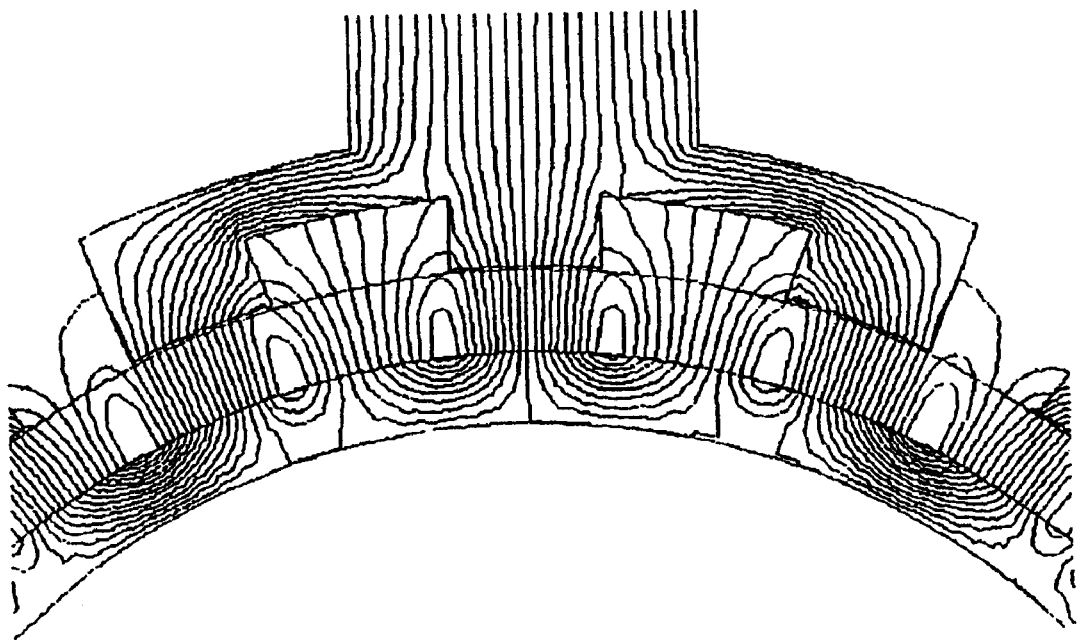
FIG. 9 is an enlarged view of flows of magnetic flux.
Figure 10:
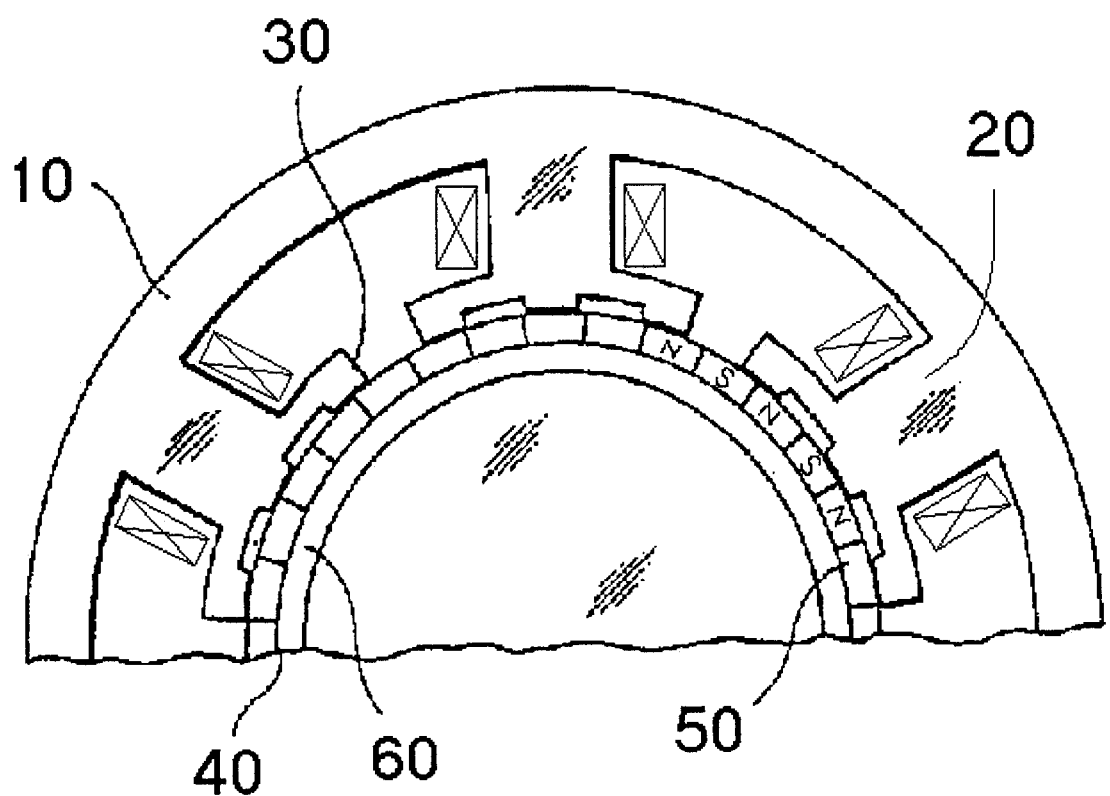
FIG. 10 depicts a preferred embodiment of the present invention.

Referring to FIG. 10, a permanent magnet motor according to a preferred embodiment of the present invention comprises a stator iron core 10 and a permanent magnet rotor 40 facing the stator iron core 10 with a gap therebetween. The stator iron core 10 comprises a cylindrical stator yoke, a plurality of stator magnetic poles 20 extending radially from an inner peripheral surface of the rotor yoke, s number of small stator teeth 30 formed on a tip end of each of the magnetic poles 20, and exciting windings wound around the stator magnetic poles 20.

The rotor 40 comprises a cylindrical permanent magnet 50 having p pieces of N pole and p pieces of S pole arranged alternately in a peripheral direction thereof at equal pitches.

A pitch of the small stator teeth 30 is 1±1/(2ms) times larger than a pitch of the rotor magnetic pole pairs. Here, m is a phase number of the permanent magnet motor of the present invention.

In another embodiment of the present invention, the pitch of the small stator teeth 30 is (1±1/6s) times larger than the pitch of the rotor magnetic pole pairs.

The width of the small stator tooth is 37~47% of the magnetic pole pitch. The depth of the groove formed adjacent small stator teeth 30 is more than 15 times larger than the length of the air gap between the stator iron core 10 and the rotor 40.

In the present invention, a width of the small tooth 30 is set to 2.2 mm, whereas the width of conventional design is 2.0 mm.

A depth of groove between adjacent small stator teeth is set to not less than 1.0 mm, whereas the depth of the conventional design is 0.4 mm.

A thickness of a shoulder of the magnetic pole connecting adjacent small stator teeth is set to about 0.9 mm, whereas the thickness of the convention design is 1.1 mm.

A thickness of the back yoke is set to 1.0 mm, whereas the thickness of the conventional design is 1.0 mm.

According to the present invention, as stated above, the interlinkage magnet flux can be increased and the cogging torque can be reduced.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A permanent magnet motor comprising a stator and a permanent magnet rotor facing the stator with an air gap therebetween, the stator having a plurality of stator magnetic poles extending radially toward a peripheral surface of the rotor, s number of small stator teeth formed on a tip end of each of the magnetic poles, and exciting windings of m phases wound around the stator magnetic poles, and the rotor having a cylindrical permanent magnet having pieces of N pole and pieces of S pole arranged alternately in a peripheral direction thereof at equal pitches, wherein a pitch of the small stator teeth is 1±1/(2ms) times larger than a pitch of the rotor magnetic pole pairs, wherein the width of the small stator tooth is 37~47% of the pitch of the rotor magnetic pole pairs, and wherein a depth of the groove formed between the adjacent small stator teeth is more than 15 times larger than the length of the air gap between the stator and the rotor.

2. A permanent magnet motor comprising a stator and a permanent magnet rotor facing the stator with an air gap therebetween, the stator having a plurality of stator magnetic poles extending radially toward a peripheral surface of the rotor, s number of small stator teeth formed on a tip end of each of the magnetic poles, and exciting windings of three phases wound around the stator magnetic poles, and the rotor having a cylindrical permanent magnet having pieces of N pole and pieces of S pole arranged alternately in a peripheral direction thereof at equal pitches, wherein a pitch of the small stator teeth is 1±1/(6s) times larger than a pitch of the rotor magnetic pole pairs, wherein the width of the small stator tooth is 37~47% of the pitch of the rotor magnetic pole pairs, and wherein a depth of the groove formed between the adjacent small stator teeth is more than 15 times larger than the length of the air gap between the stator and the rotor.

* * * * *